(12) United States Patent
Townsend et al.

(10) Patent No.: US 6,267,409 B1
(45) Date of Patent: Jul. 31, 2001

(54) VEHICLE RESTRAINT PRESENTING SYSTEM

(75) Inventors: John A. Townsend; Mohamed El-Sayed, both of Bloomfield Hills; Richard R. Vaughan, Berkley, all of MI (US)

(73) Assignee: Joalto Design, Inc., Southfield, MI (US)

( * ) Notice: Subject to any disclaimer, the term of this patent is extended or adjusted under 35 U.S.C. 154(b) by 0 days.

(21) Appl. No.: 09/169,070

(22) Filed: Oct. 9, 1998

(51) Int. Cl.[7] .............................. B60R 22/00; A47C 7/54
(52) U.S. Cl. ...................... 280/801.1; 280/808; 297/491
(58) Field of Search ................................ 280/801.1, 808, 280/801.2; 297/481, 473, 483, 411.24, 411.3, 411.31, 411.32, 411.35, 411.44, 411.36, 411.37, 411.38, 475, 353

(56) References Cited

U.S. PATENT DOCUMENTS

| | | | |
|---|---|---|---|
| 2,689,600 | * | 9/1954 | Van Briesen ................ 297/411.24 |
| 4,323,278 | * | 4/1982 | Sukopp et al. ................ 297/481 |
| 4,349,217 | * | 9/1982 | Fohl ........................... 280/808 |
| 4,681,345 | * | 7/1987 | Swartout ..................... 297/481 |
| 4,919,488 | * | 4/1990 | Deegener et al. ............. 297/481 |
| 5,015,010 | * | 5/1991 | Homeier et al. .............. 297/483 |
| 5,123,673 | * | 6/1992 | Tame .......................... 280/801.1 |
| 5,280,959 | * | 1/1994 | Nanbu ......................... 280/808 |
| 5,385,367 | * | 1/1995 | Tanaka et al. ................ 280/801.1 |
| 5,411,319 | * | 5/1995 | Kuiri .......................... 297/473 |
| 5,505,491 | | 4/1996 | Townsend . |
| 5,538,283 | | 7/1996 | Townsend . |
| 5,615,917 | * | 4/1997 | Bauer ......................... 280/808 |
| 5,658,051 | * | 8/1997 | Vega et al. ................... 280/808 |
| 5,752,719 | * | 5/1998 | Mitschelen et al. ........... 280/801.1 |

FOREIGN PATENT DOCUMENTS

| | | | |
|---|---|---|---|
| 35 45 140 | * | 6/1987 | (DE) . |
| 419 957 A1 | * | 4/1991 | (EP) . |
| 57-18542 | * | 1/1982 | (JP) . |
| WO 96 40542 | | 12/1996 | (WO) . |

* cited by examiner

Primary Examiner—J. J. Swann
Assistant Examiner—Christopher Bottorff
(74) Attorney, Agent, or Firm—Rader, Fishman & Grauer PLLC

(57) ABSTRACT

A restraint presentation system is disclosed that includes a movable presenting member, such as an armrest or an actuating arm, that moves between a presenting position and a storage position and a restraint belt connected to a tensioning mechanism. The presenting member preferably has a concave shaped portion on a distal end thereof that captures a contact portion of the restraint belt to position the restraint belt in an operational position so as to be accessible to a vehicle occupant. The tensioning mechanism biases the restraint belt into a retracted position when the presenting member is in the storage position such that the contact portion of the restraint belt is in a co-linear relationship with the concave shaped portion of the presenting member.

6 Claims, 16 Drawing Sheets

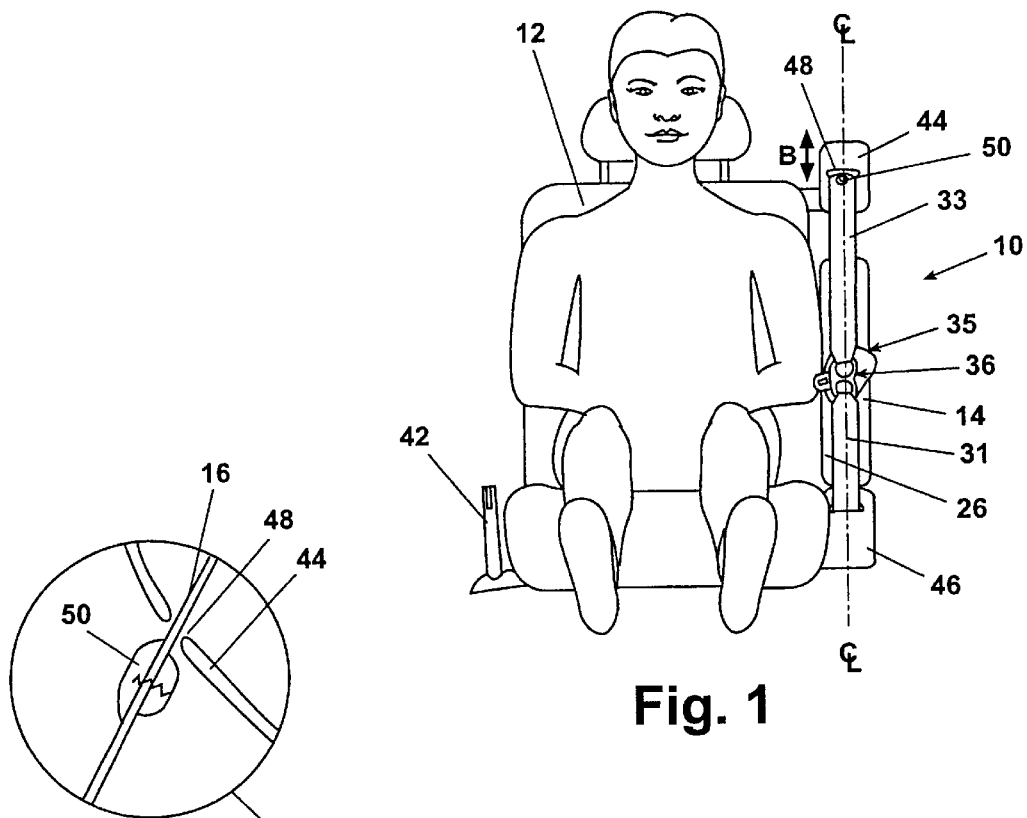
Fig. 1
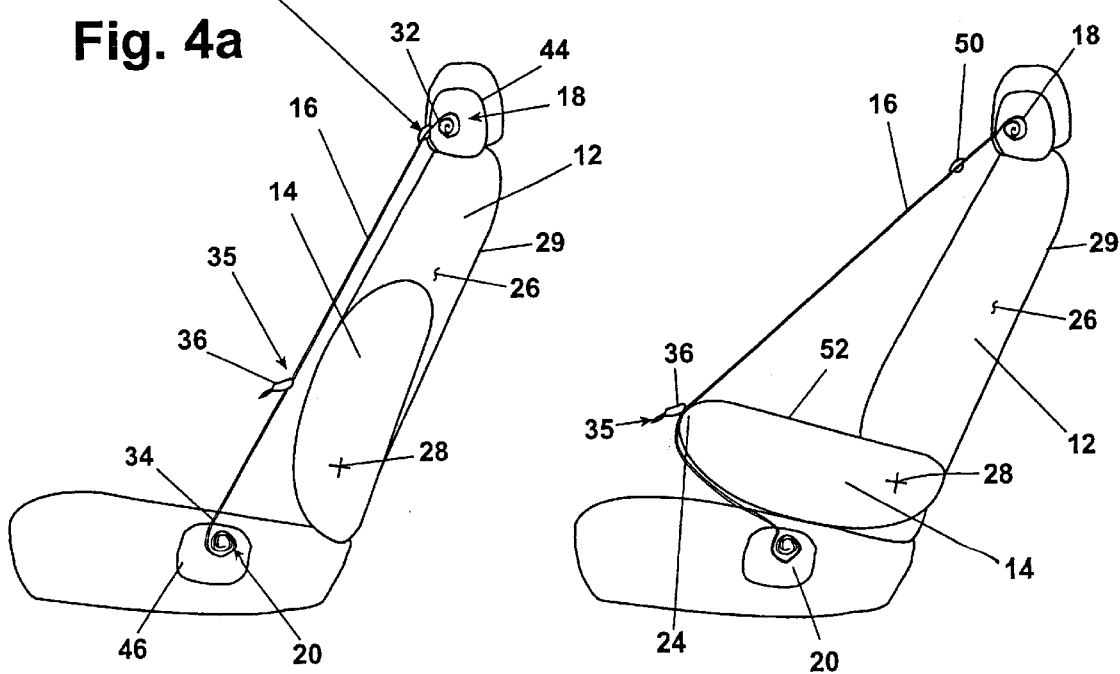
Fig. 4a
Fig. 4
Fig. 5

VEHICLE RESTRAINT PRESENTING SYSTEM

FIELD OF THE INVENTION

The present invention relates to a restraint belt presenter for vehicles, and more particularly to a presenter system that presents the restraint belt to a vehicle occupant.

BACKGROUND OF THE INVENTION

The use of restraint belts in vehicles is known for providing vehicle occupants with protection in the event of a collision or accident. Conventional restraint belts include a combination of a lap belt portion and shoulder belt portion formed from a continuous belt. In such an arrangement, one end of the belt is anchored to a structural floor member of the vehicle behind a seat on its outboard side. The other end is secured to a retracting mechanism mounted on or in the 'B' pillar rearward from the vehicle door, the outboard edge of the ceiling or floor, or in the seat back. A buckle for engaging with a receptacle positioned adjacent to the inboard side of the vehicle seat, is slidably attached to the belt. When not in use, the retracting mechanism biases the belt and buckle toward the outboard side of the vehicle.

To secure a restraint belt, the vehicle occupant typically must first twist around the seat and reach across their body to try and grab the buckle that is located above and behind the seat. Next, the occupant must draw the buckle and belt across his body such that the shoulder belt portion extends from the retracting mechanism diagonally across the occupant's chest while the lap belt portion is directed across the occupant's lap. Finally, the occupant must releasably secure the buckle to the receptacle. Such prior art restraint systems are undesirable. It is awkward for an occupant to twist around and grab a buckle. Thus, statistics have shown that people will often forget or forego using such prior art restraint systems.

To overcome the problems associated with conventional restraints systems, another type of restraint system known as a "passive" restraint system has been developed. One such passive restraint system uses separate lap and shoulder belts. The lap belt is of a conventional design wherein a retracting mechanism is positioned adjacent to the seat on its outboard side. The shoulder belt has one end attached to the vehicle door is opened, the belt extends from the inboard side of the seat away from the seat to the outer corner of the vehicle door, so as to enable the vehicle occupant to enter the vehicle between the shoulder belt and the seat. Once the door is pulled shut, the inboard end of the shoulder belt retracts, thereby securing the shoulder belt around the vehicle occupant. The lap belt is then separately secured across the occupant's lap. While restraint systems of this type reduce the problems associated with the awkward manual fastening of the seat belt, the positioning of shoulder belt reduces the available room in which the vehicle occupant may enter and exit the vehicle, thus hindering entry and exit of the vehicle.

To provide more room to enter and exit the vehicle, another known type of passive restraint system has the outboard end of the shoulder belt attached to a movable shuttle riding in a track along the upper periphery of the door opening. When the door is opened, the shuttle automatically moves the outboard end of the shoulder belt forward along the track. More room is provided for the occupant to enter and exit the vehicle without becoming inadvertently entangled in the shoulder belt. The lap belt still must be separately and manually fastened across the occupant's lap in the conventional manner. While restraint systems of this type are easy to use, the manufacturing costs of such systems are much greater than that of other known systems. Further, due to additional electric motors, drive mechanisms and component parts associated therewith, the restraint systems of this nature increase the likelihood of malfunctions that would require repair or even prevent the vehicle occupant from using the shoulder belt. Finally, body parts such as hair, may be inadvertently caught between the shuttle and the track.

To simplify restraint systems, another known type of restraint system includes a pivotable armrest positioned on the outboard side of a vehicle seat that has a combination shoulder and lap restraint belt secured in a detent mechanism at the lower forward inboard end of the armrest when the armrest. An end of the lap belt is anchored to the floor of the vehicle while an end of the shoulder belt is retractably attached to a belt reel and tensioner. When the armrest is in a lowered position, the detent serves to position the belt buckle in plain view and adjacent the vehicle occupant to permit easier grasping of the belt buckle for fastening. A guide incorporated with the armrest further assures the proper positioning of the buckle. When the belt is unbuckled and the armrest raised, the buckle is automatically returned to the detent by belt reel and tensioner to maintain the proper positioning of the buckle for the next use. However, the addition of the guide and the detent to the armrest still provide additional manufacturing steps, thereby increasing costs. Further, excessive wear on the belt is caused by the belt's repeated contact with the guide and detent, thus compromising the tensioning force of the belt.

Therefore, there exists a need for a restraint presentation system that reduces wear on the restraint belt and insures reliable positioning of the belt for repeated use.

SUMMARY OF THE INVENTION

The present invention is directed to a restraint presentation system for a vehicle seat that presents a restraint belt and buckle to a vehicle occupant in a conveniently accessible location when a presenting member is moved into a presenting position. The restraint presentation apparatus includes a presenting member, such as an armrest or actuating arm, and a restraint belt and buckle connected to a tensioning mechanism. In one embodiment, the presenting member is pivotally mounted to a side of a vehicle seat, and is movable between a presenting position and a storage position such that the presenting member is oriented substantially parallel to a seat back of the vehicle seat when in the storage position. The presenting member is movable either manually or automatically by a motor driven mechanism.

The restraint belt has first and second end segments and a contact portion therebetween. The tensioning mechanism includes two take-up reels. Each of the end segments of the restraint belt are connected to one of the take-up reels. The take-up reels have opposing biasing directions so as to position the contact portion in a co-linear relationship with a distal end of the presenting member such that when the presenting member is in the presenting position, the contact portion of the restraint belt is captured by the distal end. Thus, the restraint belt is positioned in an operational position that is within clear view and easy reach of the vehicle occupant, but without having to provide any additional attachment devices to the presenting member. Preferably, the distal end of the presentation member is contoured to have a concave shaped portion that facilitates capture of the restraint belt to insure proper positioning of the belt for each presentation operation.

In accordance with one aspect of the invention, it is preferred that a buckle is fixedly connected to the restraint belt at the contact portion of the belt. Because the take-up reels have opposing biasing directions, the contact portion and the buckle are always positioned in the co-linear relationship with the distal end of the presenting member. Thus, when the presenting member is moved into the presenting position and the distal end positions the restraint belt into the operational position, the buckle is always conveniently positioned at the distal end of the presenting member.

When packaging constraints limit the placement of the take-up rollers, one or more bobbins may be incorporated into the restraint presentation apparatus to maintain tension in the restraint belt, thereby maintaining the co-linear relationship between the contact portion of the restraint belt and the presenting member, as well as properly directing the restraint belt on and off of the respective take-up rollers as the restraint belt is returned to the retracted position or placed in the operational position.

In one alternative embodiment the presenting member is mounted to the vehicle seat such that the presenting member may be moved between the storage position and presenting position by a sweeping motion. In another alternative embodiment, the presenting member is telescoping such that the presenting member is extended into the presenting position and retracted into the storage position. The presenting member may also be mounted for lateral or vertical movement or a combination of both.

BRIEF DESCRIPTION OF THE DRAWINGS

FIG. 1 is a front elevational view of a restraint presenter system in accordance with the present invention.

FIG. 4 is a side elevational view of an armrest in the restraint presenter apparatus of FIGS. 1 and 2 wherein the armrest is in a storage position.

FIG. 4A is an enlarged partial view of a stop button in FIG. 4.

FIG. 5 is a side elevational view of the armrest in a presenting position.

DETAILED DESCRIPTION OF THE PREFERRED EMBODIMENT

An embodiment of a restraint presentation system 10 in accordance with the present invention is shown in FIGS. 1–6. While restraint presentation system 10 is shown in connection with an automobile driver-side vehicle seat 12, it is understood that restraint presentation system 10 may be incorporated with a passenger seat or the rear seats of a vehicle. Further, restraint presentation system 10 may also be used with other transport vehicles, such as sports utility vehicles, mini-vans, trucks, buses, motorized chairs, aircraft, watercraft and spacecraft.

Figure 2:
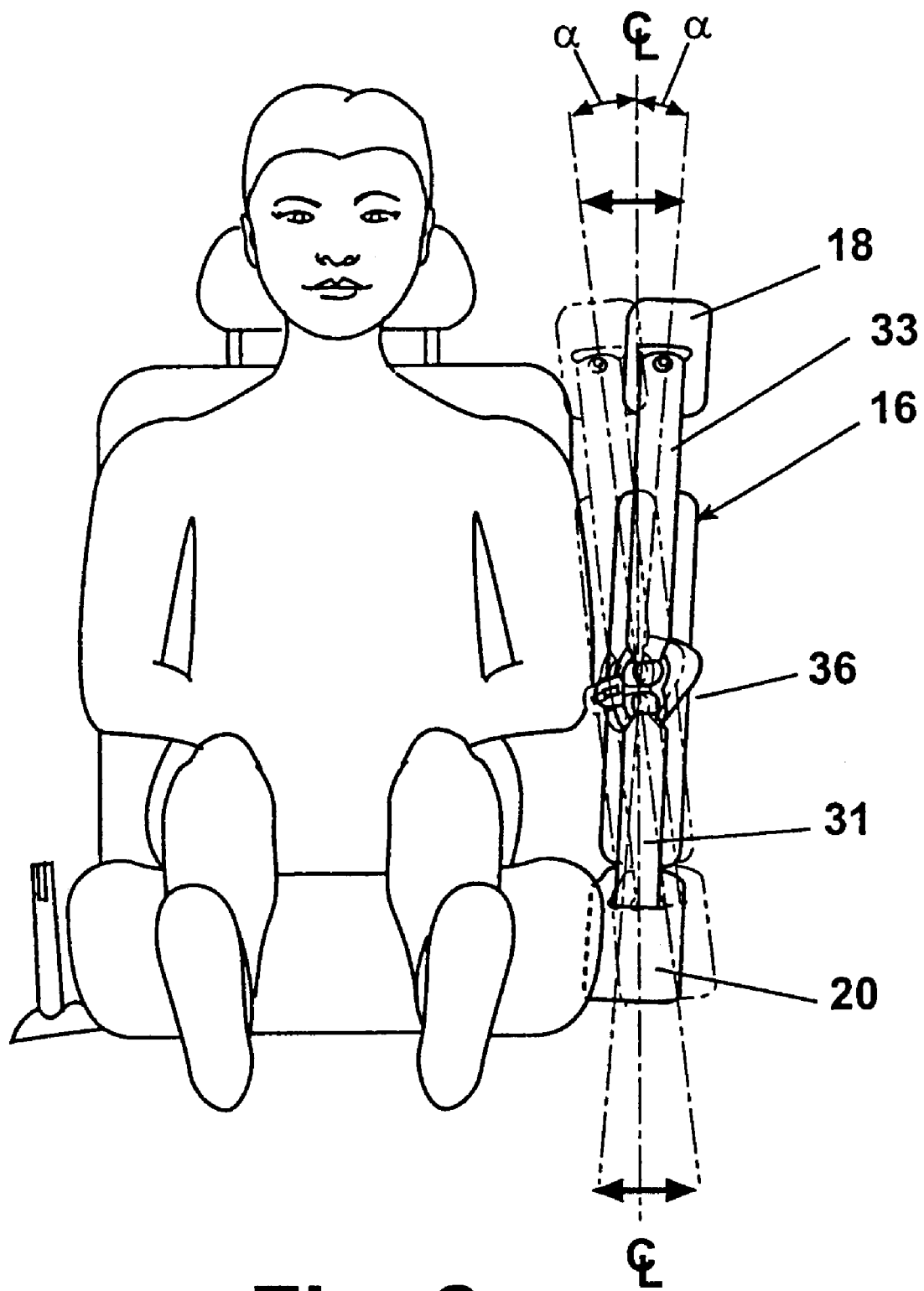
FIG. 2 is a front elevational view of the restraint presenter system depicting alternative positions of a restraint belt.
Figure 3:
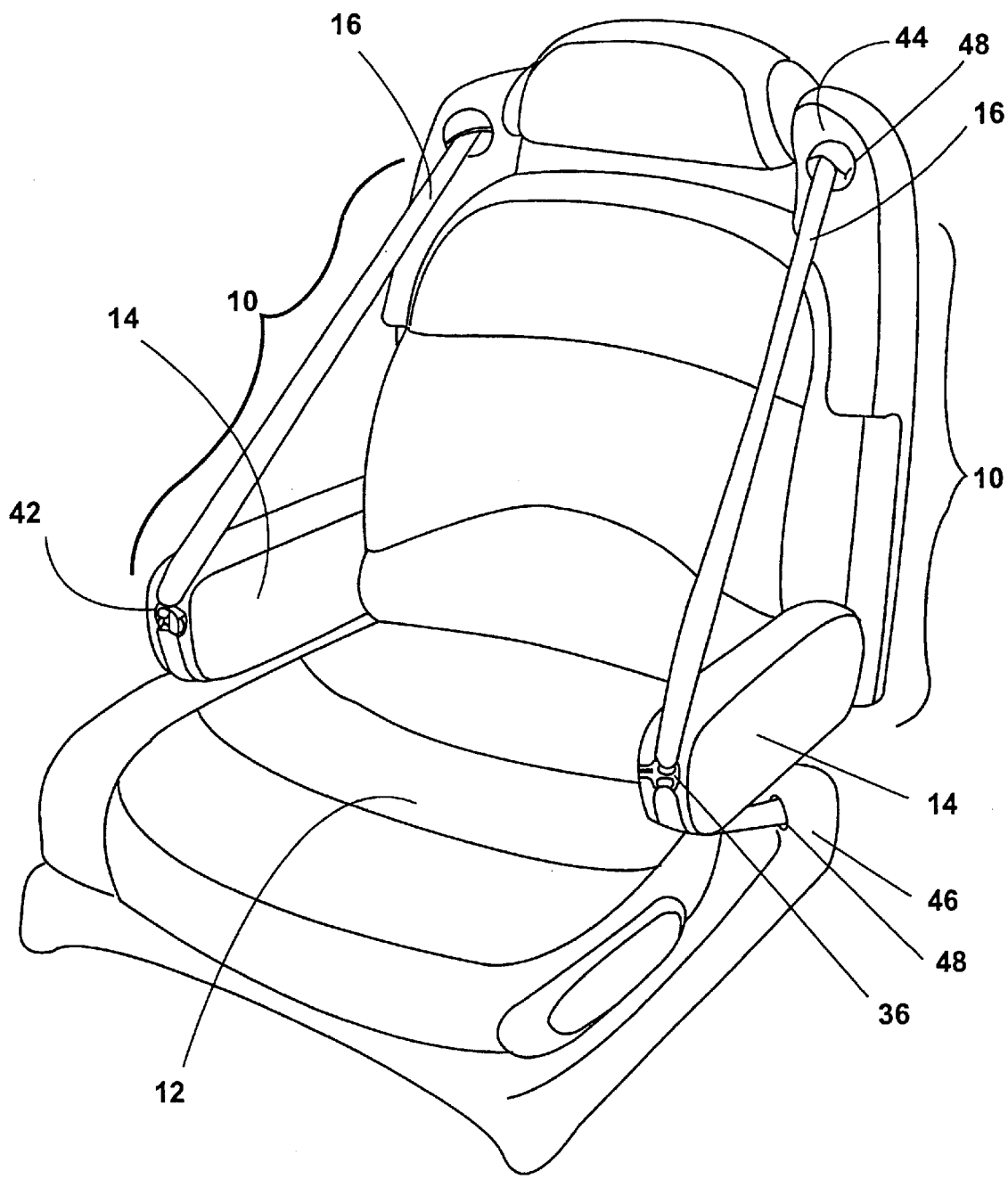
FIG. 3 is a perspective view of a harness type restraint system incorporating two restraint presenters in accordance with the present invention.

Restraint presentation system 10 includes a presenting member, such as an armrest 14, a restraint belt 16 and a tensioning mechanism having take-up reels 18 and 20. Armrest 14 is shown mounted adjacent to vehicle seat 12 on an outboard side of vehicle seat 12 as most clearly shown in FIGS. 1 and 2. However, armrest 14 may also be mounted on an inboard side of vehicle seat 12. Further, each vehicle seat 12 may be provided with a restraint presentation system 10 on both inboard and outboard sides for harness type restraint systems, as best seen in FIG. 3.

Figures 6, 6A:
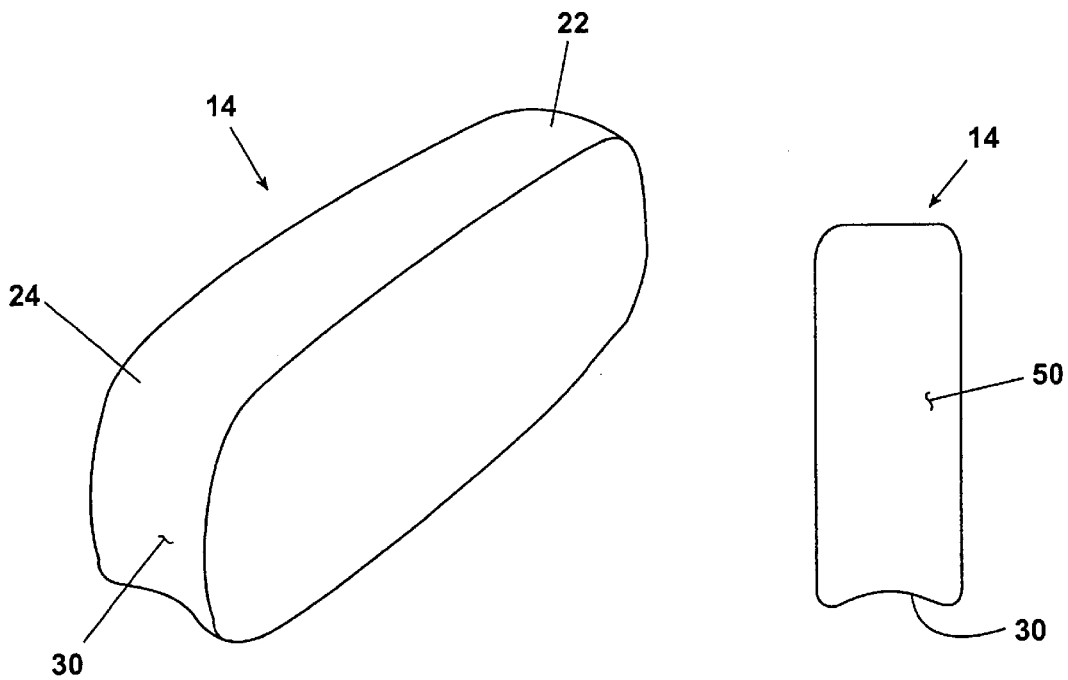
FIG. 6 is a perspective view of the armrest in accordance with the present invention.
FIG. 6A is a top view of the armrest of FIG. 6.
Figure 7:
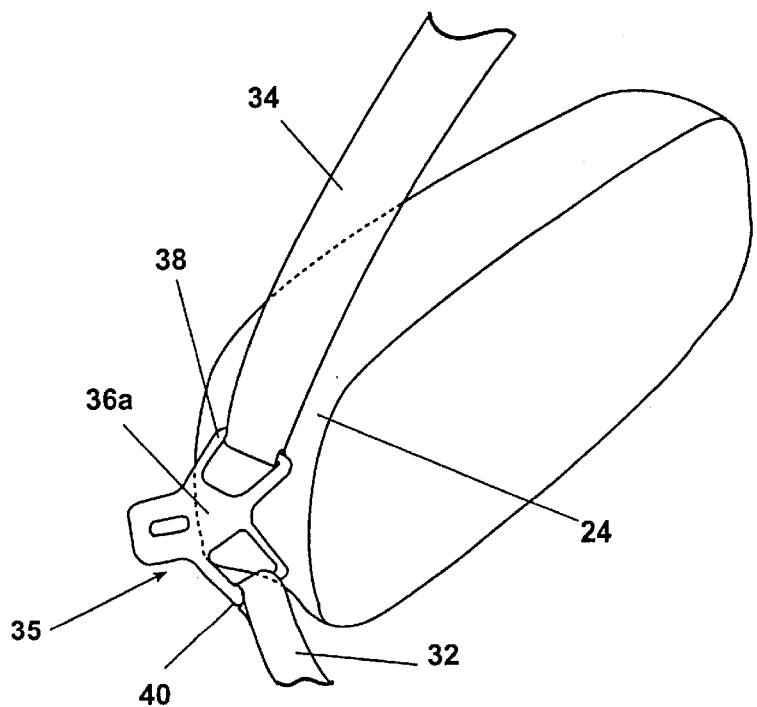
FIG. 7 is a perspective view of the armrest in the presenting position and the restraint belt in an operational position.

Armrest 14, as best seen in FIGS. 6–7, has a proximate end 22 and a distal end 24. Proximate end 22 is pivotally attached to a side surface 26 of vehicle seat 12 at pivot 28 (shown in FIGS. 4 and 5) such that armrest 14 is movable between a storage position, wherein armrest 14 is substantially parallel to a seat back 29 of vehicle seat 12, as shown in FIG. 4 and a presenting position as shown in FIG. 5. The storage position and presenting position will be explained below in greater detail. Preferably, distal end 24 is contoured with a concave shaped portion 30.

Restraint belt 16 comprises a continuous belt system having a lap belt portion 31 with a first end segment 32 and a shoulder belt portion 33 with a second end segment 34. A contact portion 35 is provided between lap and shoulder belt portions 31 and 33. A buckle 36 is received on belt 16. In the preferred embodiment, buckle 36 is fixedly connected to restraint belt 16 at contact portion 35. Alternatively, lap belt portion 32 and shoulder belt portion 34 could be two separate belts of predetermined length attached together by a buckle 36a having two anchor points 38 and 40, as best seen in FIG. 7. A latching mechanism 42 adapted for releasable engagement with buckle 36, or 36a is positioned on the opposite side of vehicle seat 12 as armrest 14. For example, in FIG. 1, armrest 14 is located on the outboard side of vehicle seat 12 while latching mechanism 42 is located on the inboard side of vehicle seat 12.

First and second end segments 32 and 34 of restraint belt 16 are connected to take-up reels 18 and 20, respectively. Take-up reels 18 and 20 operate in a conventional manner to keep restraint belt 16 snug against the vehicle occupant's body while allowing the occupant some movement. Take-up reels 18 and 20 lock in the event of a collision to retain the occupant in vehicle seat 12. Take-up reels 18 and 20 have opposing biasing directions so as to bias restraint belt 16 into a retracted position when armrest 14 is in the storage position, as best seen in FIG. 4. In accordance with one aspect of the invention, take-up reels 18 and 20 serve to position contact portion 35 of restraint belt 16 in a co-linear relationship with concave shaped portion 30 of armrest 14 such that when armrest 14 is moved into the presenting position, as seen in FIG. 5, contact portion 35 is captured by concave shaped portion 30, thereby positioning restraint belt 16 in an operational position so as to be in clear view and within easy reach of a vehicle occupant. When buckle 36 or 36a is connected to contact portion 35, buckle 36 is conveniently placed at distal end 24 of armrest 14, enabling the vehicle occupant to easily grasp buckle 36 and secure restraint belt 16 around their body. For harness type restraint systems having a restraint presentation system 10, 10a incorporated on both inboard and outboard sides of vehicle seat 12 as seen in FIG. 3, latching mechanism 42a may be incorporated with restraint belt 16a such that both latch mechanism 42a and restraint belt 16a are positioned in clear view and within easy reach of a vehicle occupant. Thus, restraint belts 16 and 16a are easily securable around the vehicle occupant.

Each take-up reel 18 and 20 is preferably mounted in a housing 44 and 46, respectively, to store the excess length of restraint belt 16 when restraint belt 16 is in the retracted position, thereby protecting restraint belt 16 from becoming tangled or otherwise damaged. Each housing 44 and 46, includes a slit 48 formed therein (shown in FIG. 4A). Slit 48 has a predetermined size and shape that is slightly larger than the corresponding width and thickness of restraint belt 16 such that restraint belt 16 may enter and exit slit 48 when moving between the retracted position and the operational position. Slit 48 serves to minimize bunching up of belt 16, thereby increasing belt wear life and reliability. Preferably, to further insure the proper positioning of belt 16 and buckle 36, or 36a, shoulder belt portion 33 is provided with an integral stop button 50, as best seen in FIG. 4A. Stop button 50 is formed with a height and depth that exceeds the size of slit 48 such that stop button 50 only permits a predetermined length of shoulder belt portion 33 to be retracted onto take-up reel 18.

Referring to FIG. 4, when restraint system 10 is not in use, armrest 14 is positioned upright in the storage position with distal end 24 oriented upward with respect to proximate end 22 and restraint belt 16 is in the retracted position. Take-up reel 18 biases shoulder belt portion 33 in a conventional manner, coiling the excess shoulder belt portion 33 within housing 44 until stop button 50 comes into contact with slit 48. Simultaneously, take-up reel 20 biases lap belt portion 31 in a conventional manner, coiling the excess lap belt portion 31 within housing 46. Due to the opposing biasing directions of take-up reels 18 and 20, buckle 36, 36a and contact portion 35 are always returned to the same location when restraint belt 16 is in the retracted position such that contact portion 35 is co-linear with respect to concave shaped portion 30 of armrest 14. While it is preferred that take-up reels 18 and 20 have consistent biasing strengths, take-up reels 18 and 20 may be provided with varying strengths, as well.

Take-up reels 18 and 20 are preferably positioned slightly vertically offset from armrest 14 such that restraint belt 16 is spaced away from and does not contact armrest 14 when restraint belt 16 is in the retracted position. This no-contact feature serves to subject restraint belt 16 to the constant tension provided by take-up reels 18 and 20 without any interference from armrest 14. Thus, wear on restraint belt 16 is advantageously reduced.

In a preferred embodiment, take-up reel 18 is mounted to side surface 26 of seat back 29 and take-up reel 20 is mounted to a side surface 52 of a seating portion 54 of vehicle seat 12, wherein take-up reel 18 is laterally fixed so as to be in co-planar alignment with take-up reel 20. Take-up reels 18 and 20 are preferably positioned so as to be in substantial alignment with armrest 14, as shown in FIG. 1. However, due to packaging restraints it may be necessary to laterally offset take-up reels 18 and 20. Referring to FIG. 2, take-up reels 18 and 20 may alternatively be laterally offset with respect to armrest 14 between an angle $\alpha$ of 0–15° such that contact portion 35 of restraint belt 16 is always co-linear with respect to concave shaped portion 30 of armrest 14, thus insuring proper operation of system 10.

Figure 8:
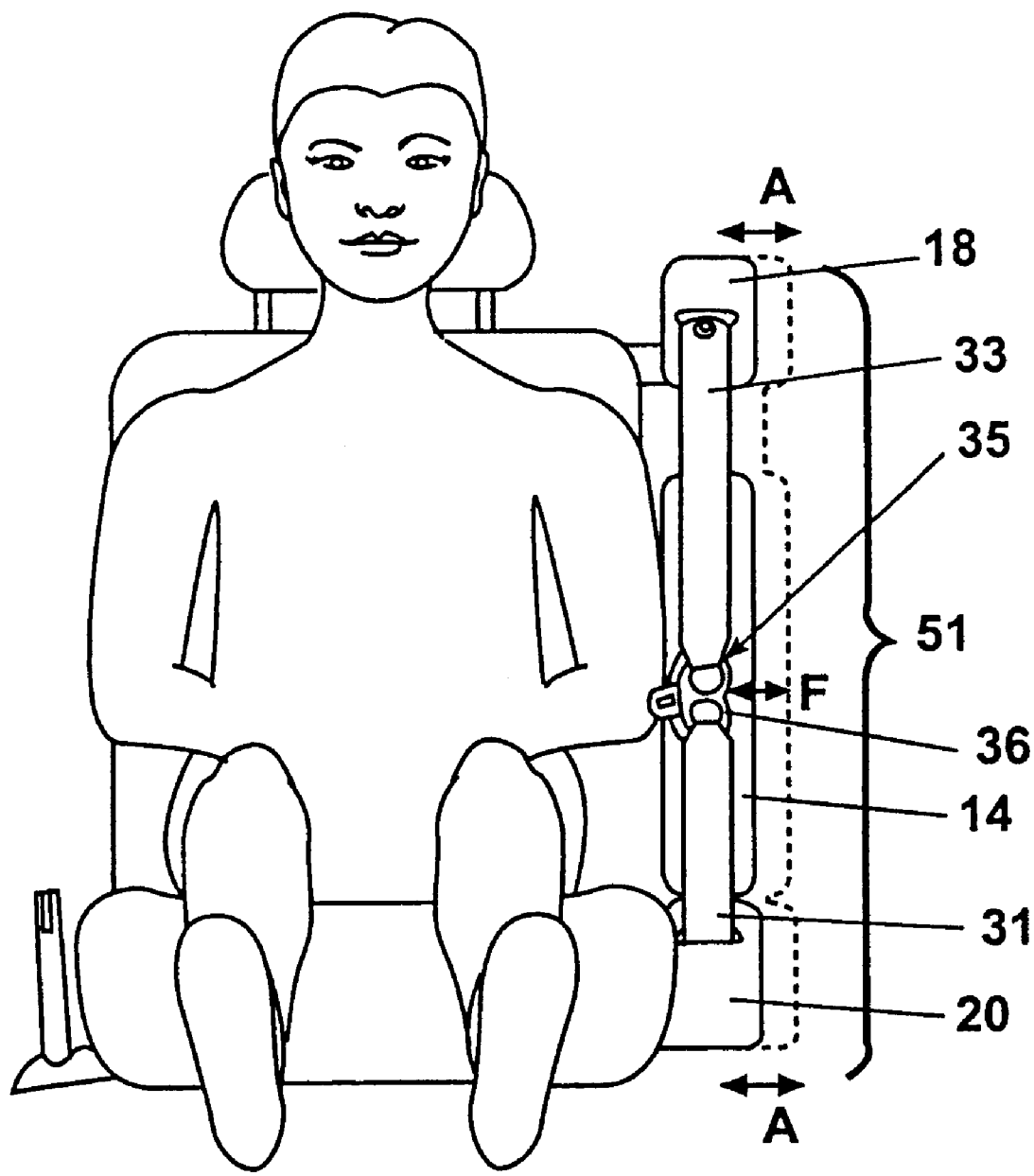
FIG. 8 is a front elevational view of the restraint presenter system showing an optional adjustability feature.

Alternatively, referring to FIG. 8, armrest 14, restraint belt 16 and take-up reels 18 and 20 may be assembled into a single sub-assembly 51 that is mounted on vehicle seat 12, such that restraint presentation system may be incorporated into a vehicle as a single unit during production or as an after-market feature. By providing restraint presentation system 10 as a single sub-assembly 51, apparatus 10 may be mounted so as to be movable in the horizontal direction indicated by directional arrows A to accommodate varying girths of the vehicle occupant. To accommodate varying heights of the vehicle occupants, housing 44 may be movable in the vertical direction as indicated by directional arrows B in FIG. 1.

Referring to FIG. 5, to operate restraint presentation system 10, armrest 14 is pivoted either manually or automatically by a gear mounted drive mechanism (not shown), downward from the storage position and into the presenting position. Because contact portion 35 of restraint belt 16 is co-linear with concave shaped portion 30, contact portion 35 and buckle 36, 36*a* of restraint belt 16 are captured by concave shaped portion 30, thereby overcoming the biasing force of take-up reels 18 and 20 and drawing restraint belt 16 into the operating position, within easy reach of the vehicle occupant.

When the vehicle occupant is seated in vehicle seat 12 and armrest 14 has presented restraint belt 16 in the operational position, the vehicle occupant may selectively grasp belt buckle 36, 36*a* (or a part of lap belt portion 31 and/or shoulder belt portion 33 adjacent to buckle 36, 36*a*), pull restraint belt 16 out of contact with armrest 14 and draw restraint belt 16 around to the opposite side of vehicle seat 12 for fastening to latching mechanism 42. As restraint belt 16 is drawn around, lap belt portion 31 wraps around the vehicle occupant's waist and shoulder belt portion 33 wraps diagonally across the vehicle occupant's torso. For harness-type restraint systems, as shown in FIG. 3, the vehicle occupant grasps belt buckle 36, or 36*a* from restraint belt 16 and latch mechanism 42*a* from restraint belt 16*a* and pulls restraint belts 16 and 16*a* out of contact with armrest 14. Restraint belts 16 and 16*a* are then drawn around the front of the occupant's torso, where buckle 36, or 36*a* is engaged with latch mechanism 42*a*.

To restore restraint belt 16 to the retracted position, the vehicle occupant releases buckle 36, or 36*a* from latching mechanism 42 and armrest 14 is then raised manually or automatically. Take-up reels 18 and 20 exert a sufficient force to bias restraint belt 16 into housings 44 and 46, thereby returning restraint belt 16 to the retracted position, co-linear with armrest 14, as shown in FIG. 4.

Figure 9:
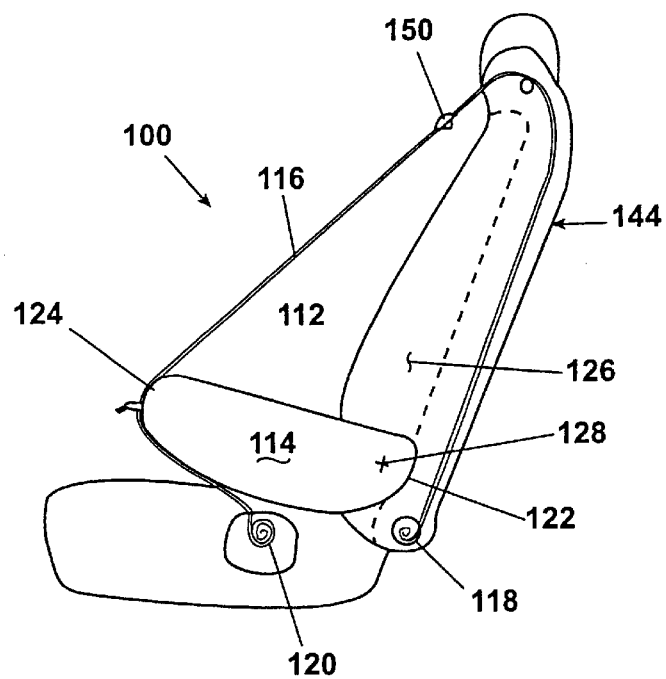
FIG. 9 is a side elevational view of an alternative embodiment of the restraint presenter system with the armrest in a presenting position.
Figures 10, 10A:
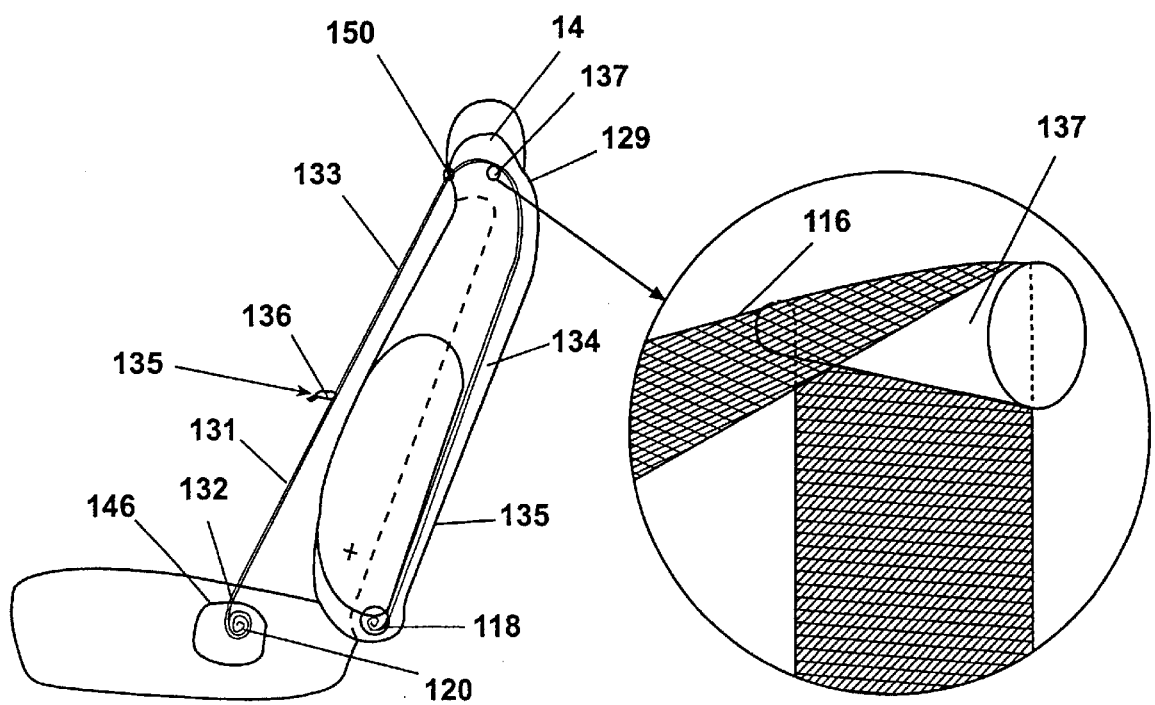
FIG. 10 is a side elevational view of the alternative embodiment of FIG. 9 with the armrest in the storage position.
FIG. 10A is an enlarged partial view of a bobbin in FIG. 10.

An alternative embodiment of an restraint presenter system 100 is shown in FIGS. 9–10. Restraint presenter system 100 operates in a substantially identical manner as system 10 and includes an armrest 114, a restraint belt 116 and take-up reels 118 and 120. Armrest 114 has a proximate end 122 and a distal end 124. Proximate end 122 is pivotally mounted to a side surface 126 of a vehicle seat 112 at a pivot point 128 such that armrest 114 is movable, either automatically or manually, between a presenting position, as shown in FIG. 9 and a storage position, as shown in FIG. 10. Distal end 124 is preferably formed with a concave shaped portion (not shown) similar to that as in system 10.

Restraint belt 116 includes a lap belt portion 131 with a first end segment 132 and a shoulder belt portion 133 with a second end segment 134. A contact portion 135 is provided between lap belt portion 131 and shoulder belt portion 233. A buckle 136 is received on restraint belt 116. Preferably, buckle 136 is fixedly connected to restraint belt 116 at contact portion 135. Buckle 136 is releasably connectable with a latching mechanism (not shown) that is positioned adjacent vehicle seat 12, on a side opposite armrest 114.

First and second end segments 132 and 134 of restraint belt 116 are connected to take-up reels 118 and 120, respectively. In a manner similar to system 10, take-up reels 118 and 120 bias belt 116 into a retracted position as shown in FIG. 9, wherein contact portion 135 of belt 116 is positioned, so as to be co-linear with respect to distal end 124 of armrest 114. In this embodiment, take-up reels 118 and 120 are shown mounted in substantially vertical alignment along a base portion 137 of vehicle seat 112. A bobbin 139, as more clearly seen in FIG. 10A, is positioned on a top portion of seat back 129. Bobbin 139 cooperates with take-up reel 118 to maintain tension in restraint belt 116, as well as the co-linear relationship of contact portion 135 and distal end 124 of armrest 114. Further, bobbin 139 cooperates in retracting excess shoulder belt portion 134 when restraint belt 116 is moved into the retracted position, insuring that restraint belt 116 does not contact armrest 114 when in the retracted position. Bobbin 139 is shown having a generally conical shape that belt 116 slides over, changing the direction of restraint belt 116 to direct restraint belt 116 onto take-up reel 118. Other suitable shapes may be used depending upon the location of the take-up reel 118 and desired bend of restraint belt 116. The invention further contemplates providing either take-up reel 118 or 120 with one or more bobbins 139 similar to bobbin 139 if packaging constraints require alternative placements of take-up reels 118 and 120.

Take-up reels 118 and 120 may be mounted in housings 144 and 146, respectively, to store and protect the excess length of restraint belt 116 when in the retracted position. Housing 144 for take-up reel 118 further encloses bobbin 139 such that housing 144 extends substantially the length of vehicle seat 112, as seen in phantom in FIG. 9. Each housing 144 and 146 may be provided with a slit (not shown), similar to slit 48 in system 10, for permitting restraint belt 116 to enter and exit housings 144 and 146. Restraint belt 116 may also be provided with a stop button 150 that cooperates with the slit formed in one of the housings 144 or 146 to limit the extent of retraction of restraint belt 116, in a manner similar to system 10.

The operation of restraint presenting system 100 is substantially identical to system 10. Armrest 114 is pivoted either manually or automatically from the storage position into the presenting position. Because contact portion 135 of restraint belt 116 is co-linear with distal end 124 of armrest 114, contact portion 135 is captured by distal end 124. Thus, restraint belt 116 and buckle 136 is positioned in an operational position, as shown in FIG. 8, conveniently in clear view and within easy access of the vehicle occupant. When armrest 114 is raised into the storage position and out of contact with restraint belt 116, take-up reels 118 and 120 bias restraint belt 116 into housings 144 and 146 and onto take-up reels 118 and 120, returning restraint belt 116 to the retracted position.

Figure 11:
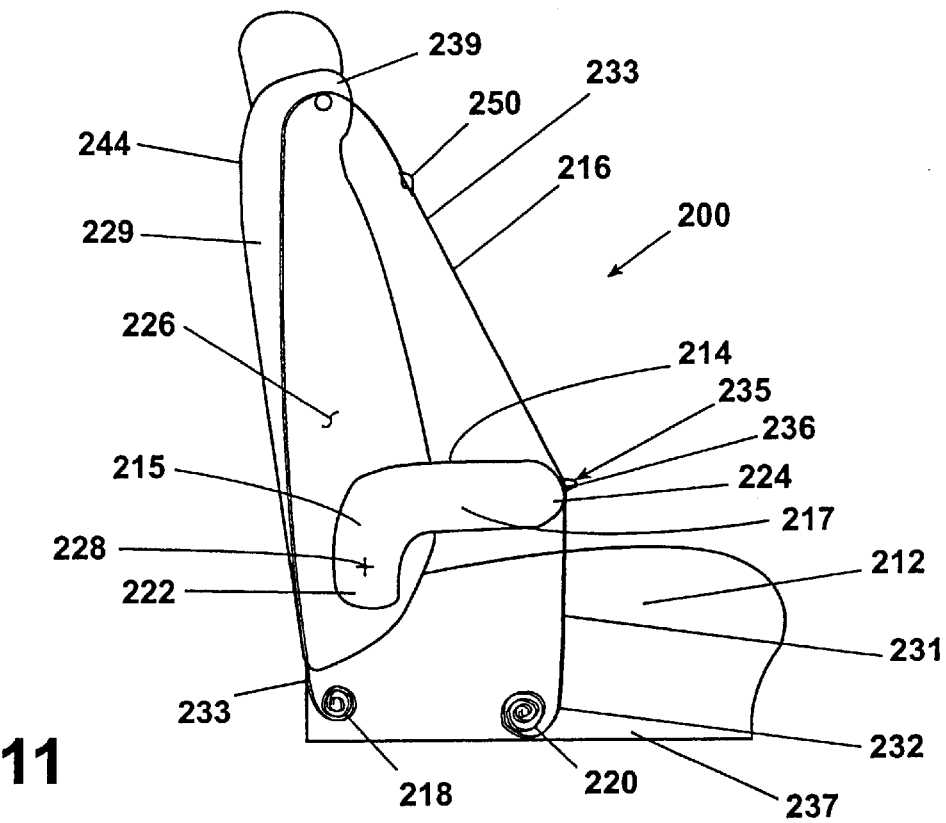
FIG. 11 is a side elevational view of an alternative embodiment of the restraint presenter system with an L-shaped armrest in a presenting position.
Figure 12:
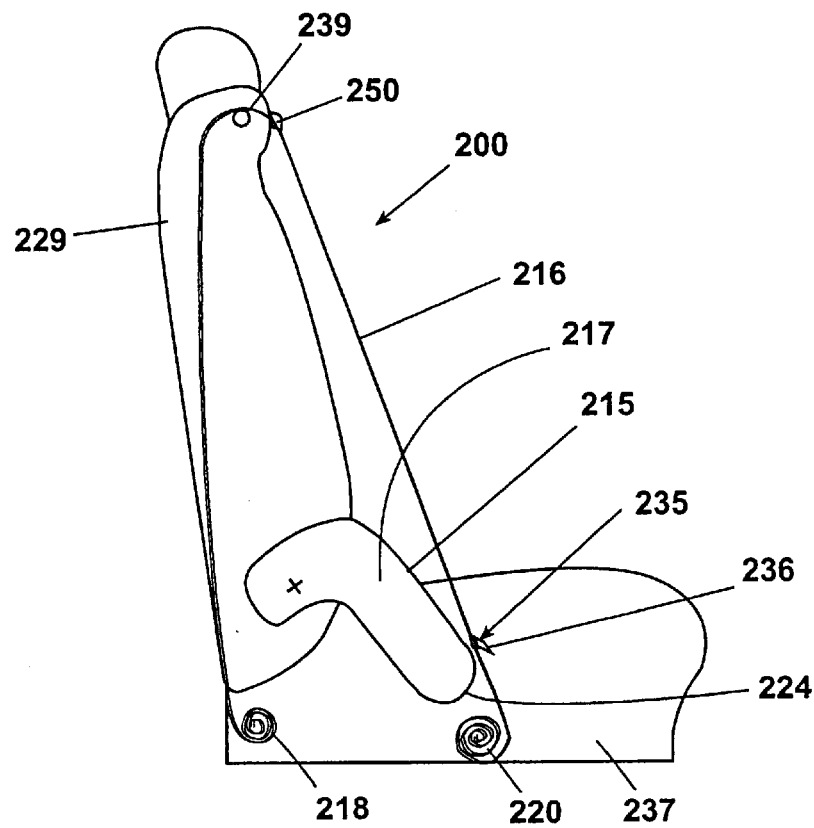
FIG. 12 is a side elevational view of the alternative embodiment of FIG. 11 with the L-shaped armrest in the storage position.

Alternative embodiments of restraint presenting systems are shown in FIGS. 11–25. Referring to FIGS. 11–12, restraint presenting system 200 is substantially identical to systems 10 and 100. Restraint present system 200 includes an armrest 214, a restraint belt 216 and take-up reels 218 and 220. An optional bobbin 239 may also be provided, similar to bobbin 139 in system 100.

Armrest 214 is generally L-shaped with a first leg 215 and a second leg 217. First leg 215 includes a proximate end 222 and second leg 217 includes a distal end 224. Proximate end 222 of first leg 215 is pivotally mounted to a side surface 226 of a housing 244 for restraint belt 216, or vehicle seat 212, at a pivot point 228. Thus, armrest 214 is pivotally movable, either automatically or manually, between a presenting position, as shown in FIG. 11 and a storage position, as shown in FIG. 12. Distal end 224 is preferably formed with a concave shaped portion (not shown) similar to that as shown in system 10.

Restraint belt 216 includes a lap belt portion 231 with a first end segment 232 and a shoulder belt portion 233 with a second end segment 234. A contact portion 235 is provided between lap belt portion 231 and shoulder belt portion 233. A buckle 236 is received on restraint belt 216. Preferably, buckle 236 is fixedly connected to restraint belt 216 at contact portion 235. Buckle 236 is releasably connectable with a latching mechanism (not shown) positioned adjacent vehicle seat 212, on a side opposite armrest 214 similar to system 10.

First and second end segments 232 and 234 are connected to take-up reels 218 and 220, respectively. In a manner substantially identical to apparatus 10 and 100, take-up reels 218 and 220 bias restraint belt 216 into a retracted position as shown in FIG. 12, wherein contact portion 235 of restraint belt 216 is positioned so as to be co-linear with respect to distal end 224 of armrest 214. Take-up reels 218 and 220 may be mounted to vehicle seat 212 in a manner similar to system 10, or in a manner similar to system 100. Take-up reels 218 and 220 are mounted in substantially vertical alignment along a base portion 237 of vehicle seat 212. Bobbin 239 is positioned on a top portion of seat back 229. Bobbin 239 cooperates with take-up reel 218 to maintain tension in restraint belt 216, as well as the co-linear relationship of contact portion 235 and distal end 224. Further, bobbin 239 cooperates in retracting excess shoulder belt portion 233 when restraint belt 216 is moved into the retracted position.

To operate armrest restraint presenting system 200, armrest 214 is pivoted, either manually or automatically by a gear mounted drive mechanism, upward from a storage position (shown in FIG. 12) into the presenting position (shown in FIG. 11) where second leg 217 of armrest 214 is positioned so as to be substantially horizontal. Because contact portion 235 of restraint belt 216 is co-linear with armrest 214, contact portion 235 is captured by distal end 224, preferably by the concave shaped portion (not shown), such that restraint belt 216 and buckle 236 are placed in the operational position, as shown in FIG. 11. The buckle is thus presented in clear view and within easy access of the vehicle occupant. When armrest 214 is lowered into the storage position, take-up reels 218 and 220 bias restraint belt 216 into the retracted position, co-linear with armrest 214.

Figure 13:
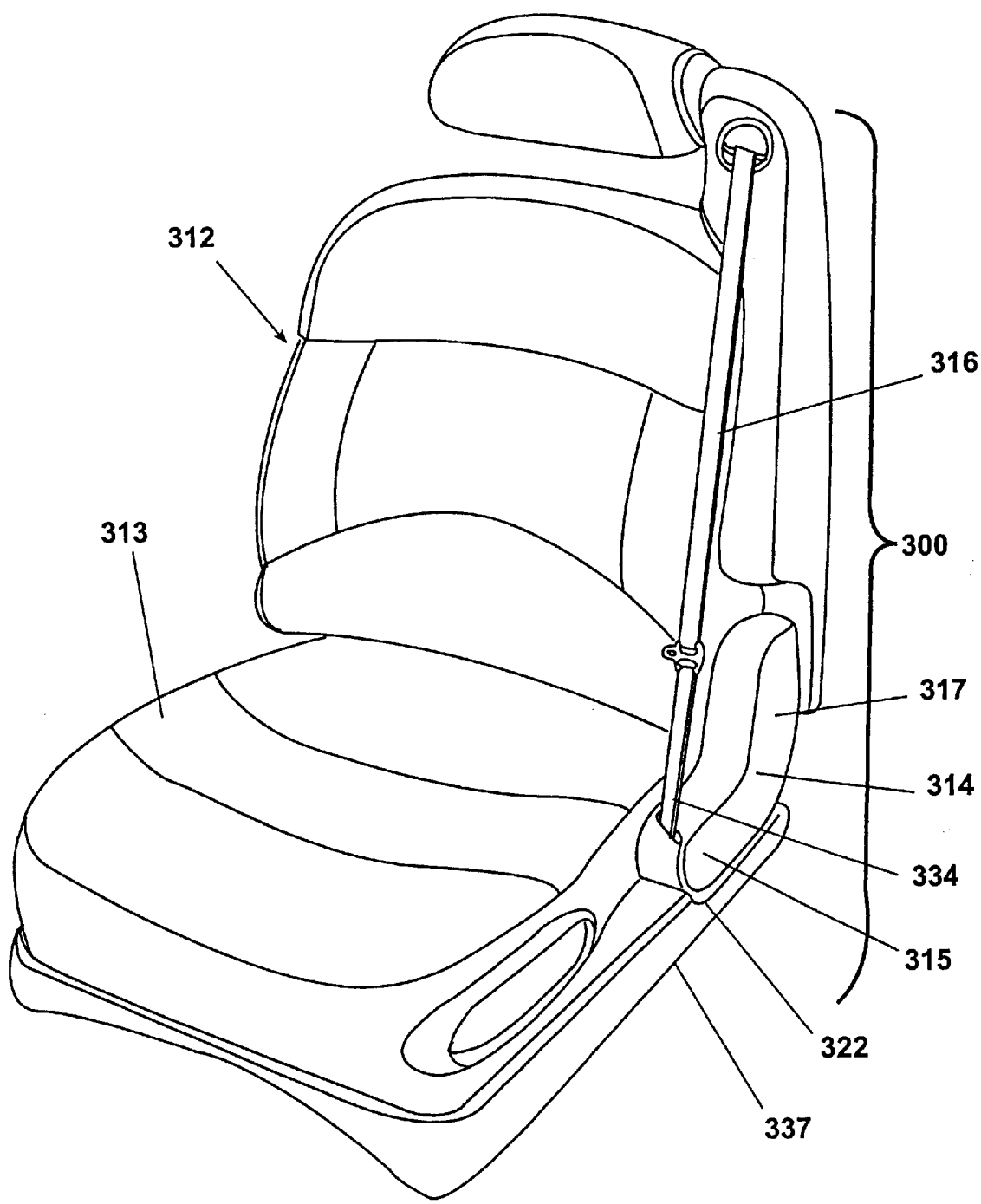
FIG. 13 is a perspective view of an alternative embodiment of the restraint presenter system with an L-shaped armrest in a storage position.
Figure 14:
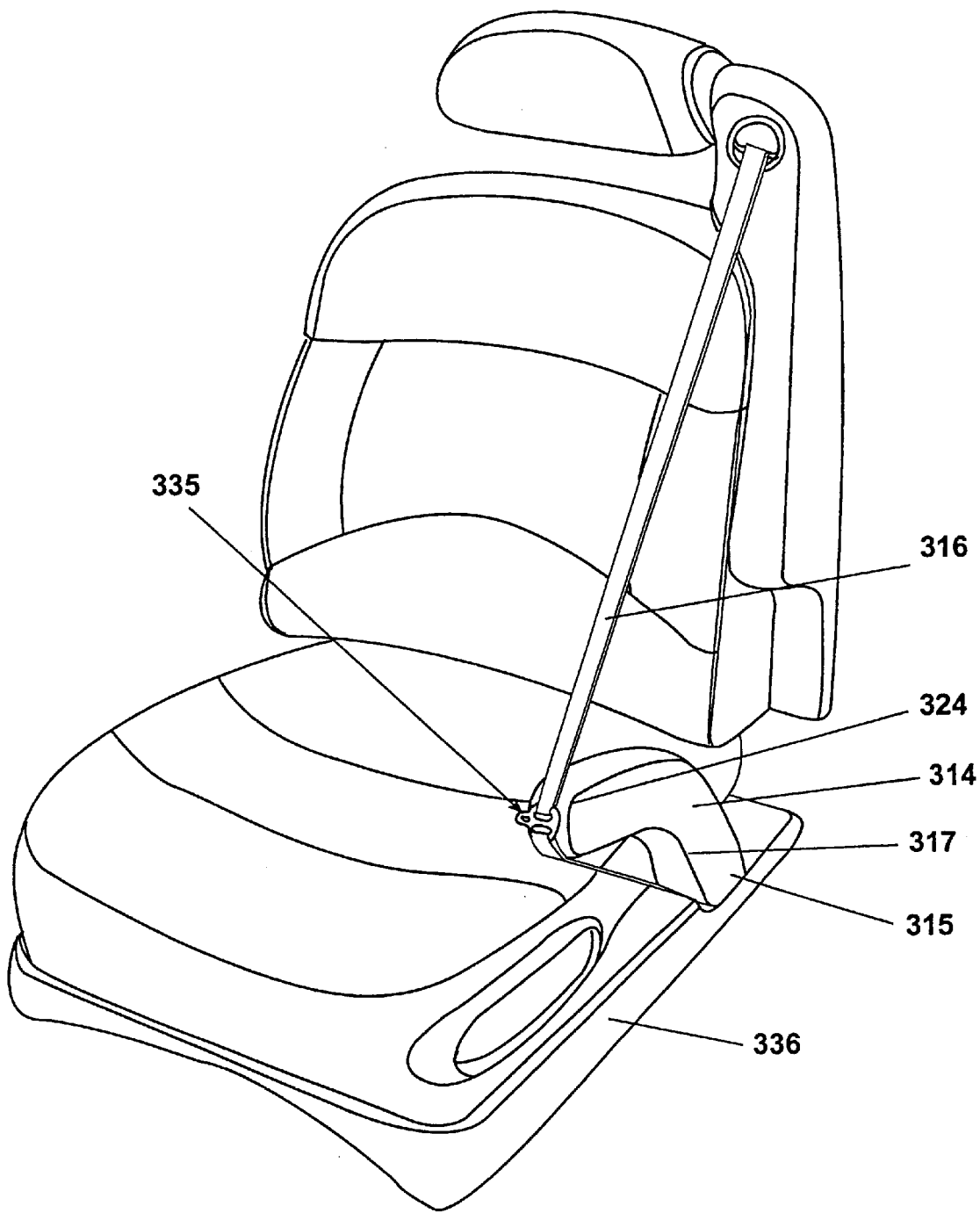
FIG. 14 is a perspective view of the alternative embodiment of the restraint presenter system of FIG. 13 with the L-shaped armrest in the presenting position.

To promote easier entry and exit from the vehicle, an another alternative embodiment of a restraint presenting system 300, armrest 314 may optionally be pivotally connected to a base portion 337 of the vehicle seat 312 such that when armrest 314 is in the storage position, as shown in FIG. 13, first leg 315 is substantially parallel to a seating surface 313 of vehicle seat 312 and second leg 317 is substantially parallel to a seat back 329 of vehicle seat 312. A take-up reel (not shown) is positioned within armrest 314 such that second end segment 334 of restraint belt 316 is retracted into proximate end 322 of armrest 314 when in the storage position. By placing take-up reel 320 within armrest 314, co-linearity of restraint belt 316 and armrest 314 is further insured. When armrest 314 is forward pivoted into the operational position, as shown in FIG. 14, distal end 324 of armrest 314 captures restraint belt 316 at contact portion 335, thereby positioning restraint belt 316 and buckle 336 in the operational position that is conveniently within clear view and easy access of a vehicle occupant.

Figure 15:
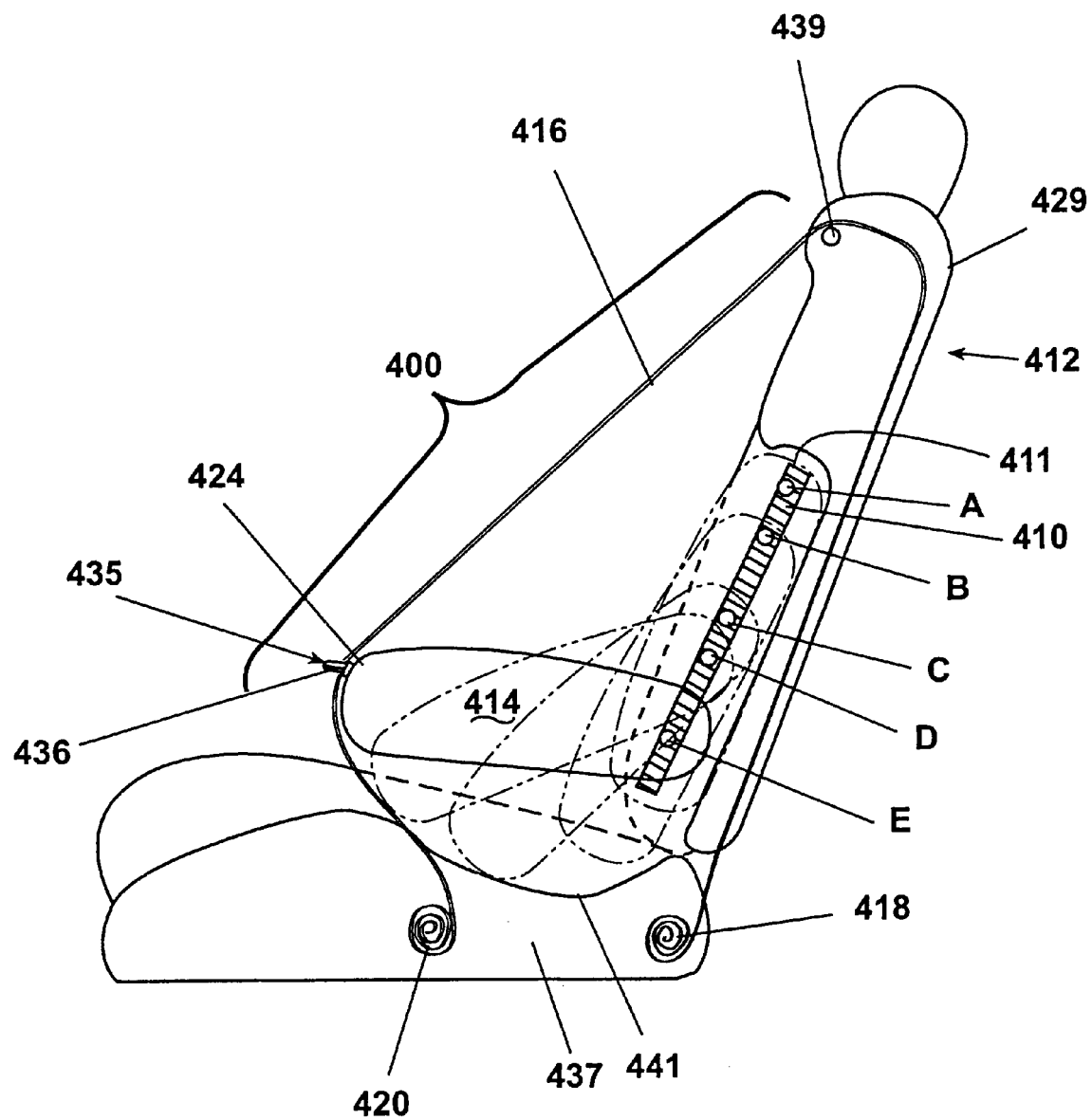
FIG. 15 is a side elevational view of an alternative embodiment of the restraint presenter system showing the path that the armrest follows when moving between a storage position and a presenting position.
Figure 16:
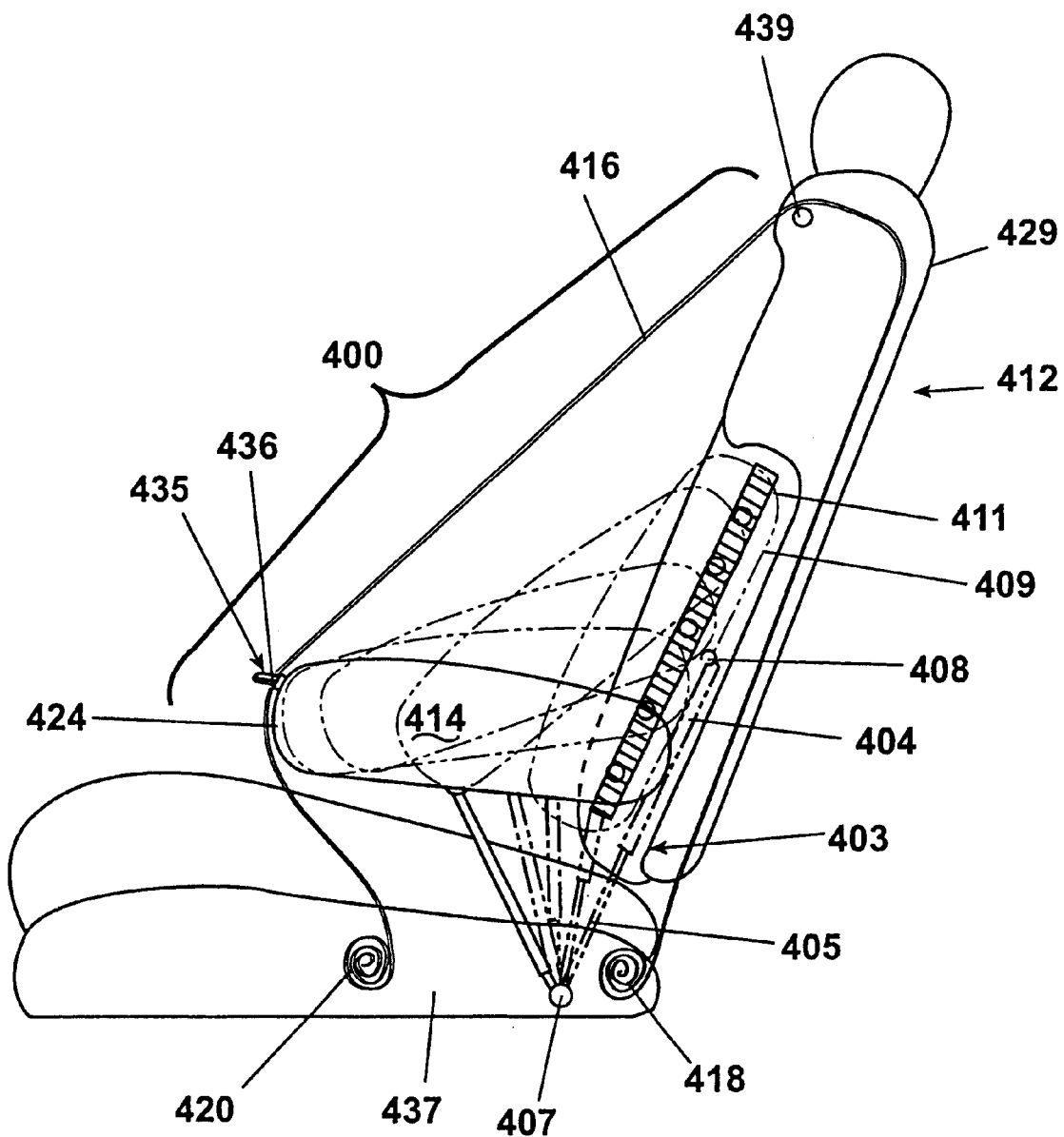
FIG. 16 is a side elevational view of an alternative embodiment of the restraint presenter system of FIG. 15 showing the path that the armrest follows when moving between a storage position and a presenting position.

Referring to FIGS. 15–16, armrest 414 may alternatively be mounted to vehicle seat 412 so as to provide a sweeping movement of armrest 414. Armrest restraint presenting system 400 includes a track 410 mounted on a side surface 426 of vehicle seat back 429. Proximate end 422 of armrest 414 is provided with a shaft 411 that is slidably received in track 410. Further, shaft 411 cooperates with track 410 to permit pivotal movement of armrest 414, as well. Thus, armrest 414 achieves both translational and pivotal movement as armrest 414 moved between storage and presenting positions. Base portion 437 of vehicle seat 412 preferably includes a contoured section 441 that serves to guide distal end 424 of armrest 414 as armrest is moved between the storage and presenting positions. Take-up reel 420 cooperates with take-up reel 418 to position restraint belt 416 co-linear with armrest 414 in accordance with the invention.

Referring to FIG. 15, when armrest 414 is in the storage position, armrest 414 is substantially parallel to seat back 429 and shaft 411 is in position A. As armrest 414 is moved into the presenting position, either manually or automatically by a gear mounted drive mechanism, armrest 414 is pivoted about shaft 411 and moved along track 410 as indicated by positions B, C and D. Distal end 424 moves along contoured section 441 of base portion 437 of vehicle seat 412, and then captures restraint belt 416. When shaft 411 reaches position E, armrest 414 is in the presenting position, with buckle 436 of restraint belt 416 captured by distal end 424 within clear view and easy access of the vehicle occupant.

Preferably, armrest 414 is moved between the storage position and the presenting positioned automatically by a motorized gear mounted drive mechanism (not shown). To permit easy exit from the vehicle when there is a power down situation, i.e., the drive mechanism is inoperable, armrest 414 may be manually returned to the storage position either by moving in a reverse sweeping motion such that shaft 411 is returned to position A or, alternatively, distal end 422 may be pivoted upward about shaft 411 when pivot is in position E, in a manner similar to system 10. Once armrest 414 is placed in the storage position, take-up reels 418 and 420 automatically return restraint belt 416 to the retracted position in a manner similar to systems 10, 100, 200 and 300.

To incorporate armrest 414 into an existing vehicle seat 412 while minimizing modifications to base portion 437 of vehicle seat 412, armrest restraint presenting system 400 may be further provided with a telescoping lever 403 as seen in FIG. 16. Telescoping lever 403 has a hollow tube member 404 that receives a shaft 405 in a slidable engagement. Shaft 405 includes a first end 407 pivotally connected to base portion 437 of vehicle seat 412 and a second end 408 pivotally connected to a bottom surface 409 of armrest 414. When armrest 414 is in the storage position, telescoping lever 403 is in a fully extended position. As armrest 414 is moved to the presenting position to capture distal end 424 of restraint belt 414 at contact portion 435, shaft 405 slides into tube member 404 and first end 407 and second end 408 are pivoted to properly position armrest 414 into the presenting position. The length shaft 405 and tube member 404 are determined by packaging considerations, however, it is preferred that shaft 405 and tube member 404 cooperate to position armrest 414 so as to be substantially horizontal when in the presenting position.

Figure 17:
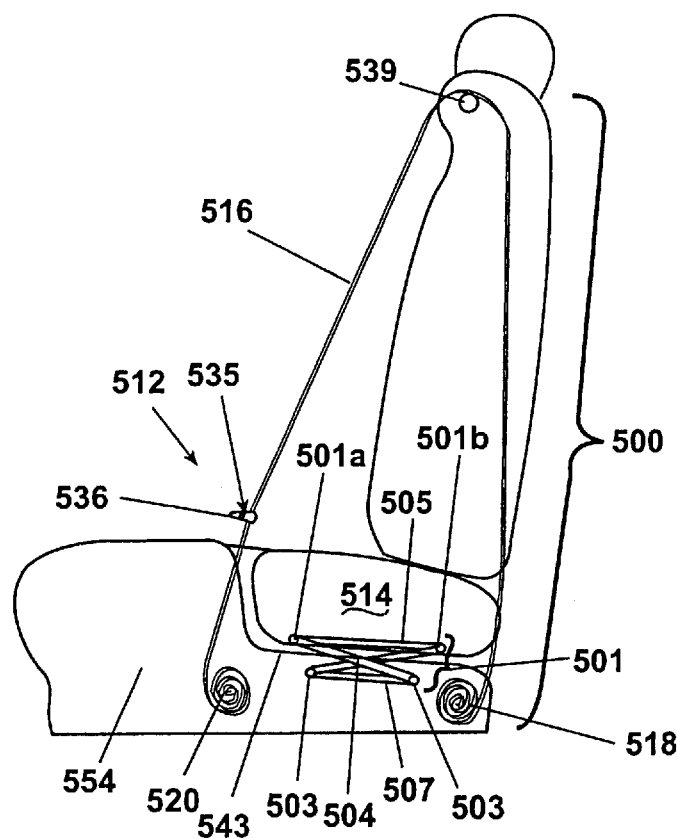
FIG. 17 is a side elevational view of an alternative embodiment of the restraint presenter system wherein the armrest is in a storage position.
Figure 18:
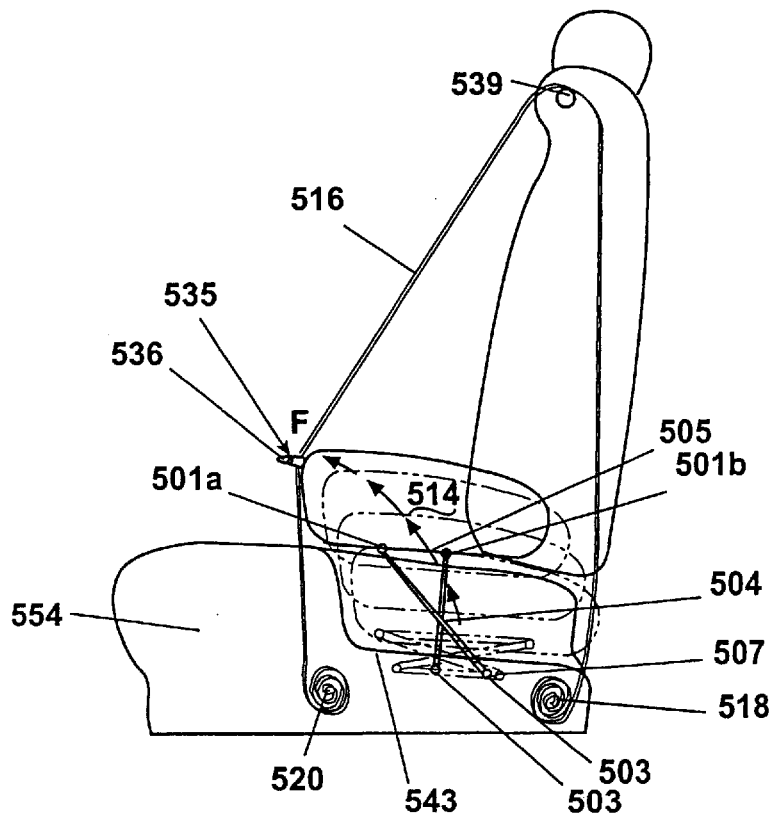
FIG. 18 is a side elevational view of the restraint presenter system of FIG. 17 showing the path that the armrest follows when moving between a storage position and a presenting position.

In another embodiment, referring to FIGS. 17 and 18, vehicle seat 512 may be provided with an oversized seating portion 554 that has a movable section that moves vertically to serve as an armrest 514 when moved from a storage position to a presenting position. Base portion 537 of the vehicle seat 512 includes a groove section 543 that armrest 514 is disposed in when armrest 514 is in the storage position. Armrest restraint presenting system 500 further includes a pair of scissor levers 501 that each have a first end 502 and a second end 503. Scissor levers 501 are connected together by a pin 504 such that first ends 502 and second ends 503 may be moved together, as explained below in further detail.

Both armrest 514 and grove section 543 of vehicle seat 512 include tracks 505 and 506, respectively, formed therein. Track 505 is positioned along a bottom surface 509 of armrest 514 and has first ends 502 of scissor levers 501 slidably engaged therein. Track 506 is positioned along a top portion 507 of groove section 539 and has second ends 503 of scissor levels 501 slidably engaged therein.

To position armrest 514 in the presenting position, first and second ends 502 and 503 of scissor levers 501 slide towards one another within tracks 505 and 506, respectively. Thus, armrest 514 is moved upwardly in an arcuate path, as shown by directional arrows F, from seating portion 554. Because take-up reel 520 cooperates with take-up reel 518 to position restraint belt 516 co-linear with armrest 514, distal end 524 of armrest 514 captures contact portion 535 of restraint belt 516 thereby positioning restraint belt 516 and buckle 536 within clear view and easy reach of a vehicle occupant. To insure the proper lateral placement of armrest 514 when armrest is moved in arcuate path F, first end 502a of scissor levers 501 is fixed, such that first end 502b slides toward first end 502a while second ends 503 slide toward one another to move armrest 514 upwardly in arcuate path F.

Figure 19:
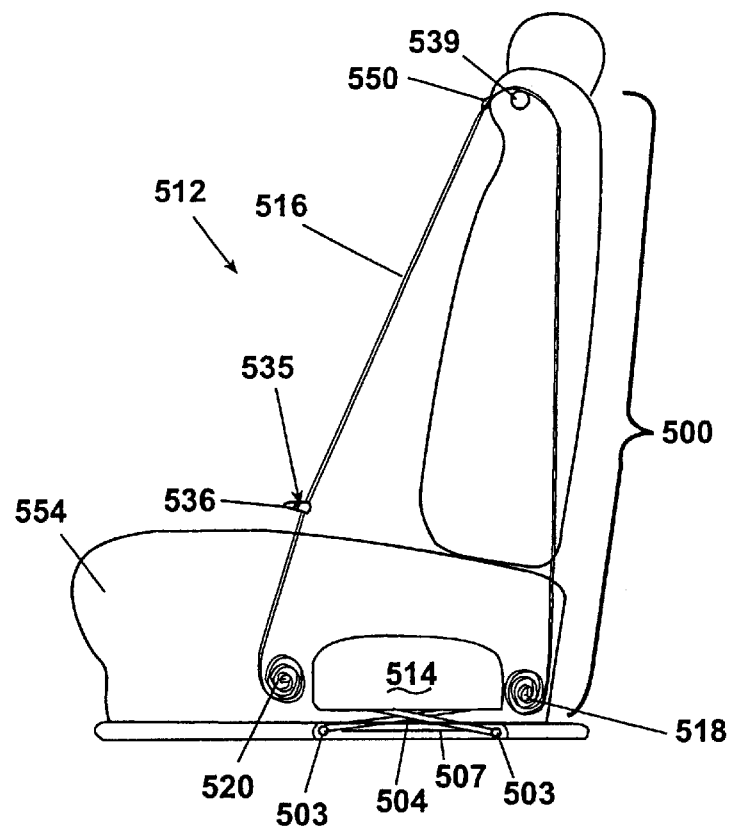
FIG. 19 is a side elevational view of an alternative embodiment of the restraint presenter system of FIGS. 17 and 18, wherein the armrest is in a storage position.
Figure 20:
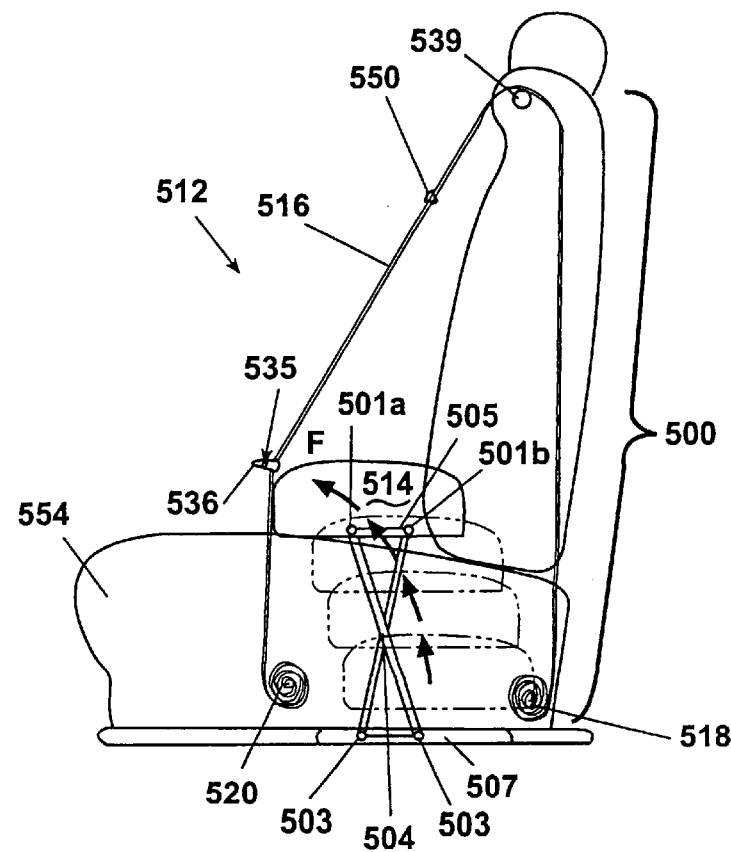
FIG. 20 is a side elevational view of the restraint presenter system of FIG. 19 showing the path that the armrest follows when moving between a storage position and a presenting position.

Scissor levers 501 may also be used on an existing vehicle seat 512 such that no modifications are required of seating portion 554 by providing scissor levers 501 with a greater length. Referring to FIGS. 19 and 20, armrest 514 has track 505 formed therein and base portion 537 of vehicle seat 512 has track 506 formed therein. Alternatively, track 506 may be formed in the floor of the vehicle. First ends 502 are slidably engaged in track 505 and second ends are slidably engaged in track 506. When armrest 514 is in a storage position, armrest 514 is preferably located adjacent a floor of vehicle 512 and scissor levers 501 are spaced apart. As armrest 514 is moved to an operational position, first end 502b slides towards first end 502a along track 505, and second ends 503 slide toward one another along track 506. Thus, armrest 514 is moved into contact with restraint belt 516, as indicated by arcuate path F, such that distal end 524 captures contact portion 535 to present buckle 536 and restraint belt 516 to a vehicle occupant due to the co-linear placement of restraint belt 516 with respect to armrest 514 by take-up reels 518 and 520.

Figure 21:
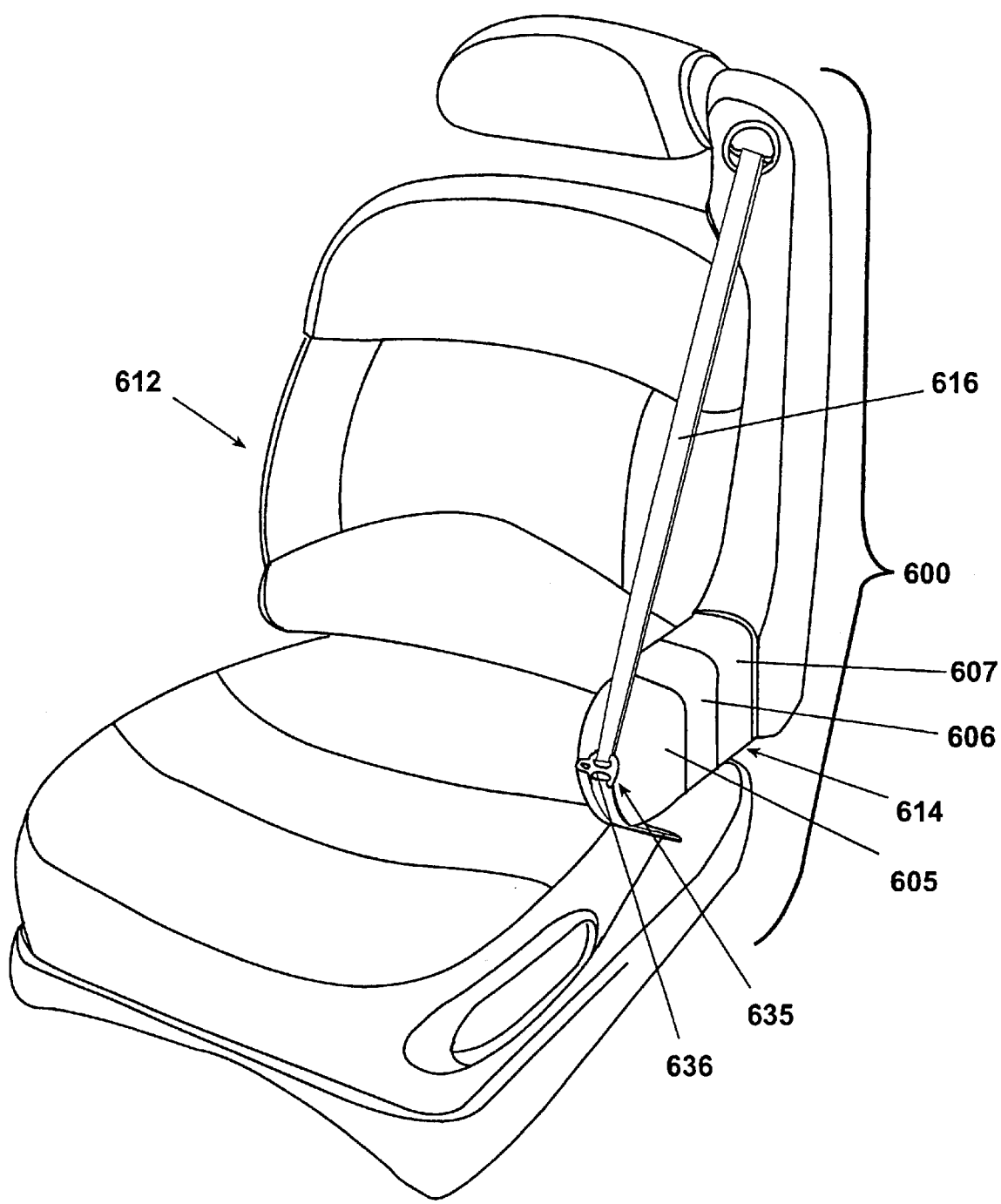
FIG. 21 is a perspective view of an alternative embodiment of the restraint presenter apparatus showing a telescoping armrest in a presenting position.
Figure 22:
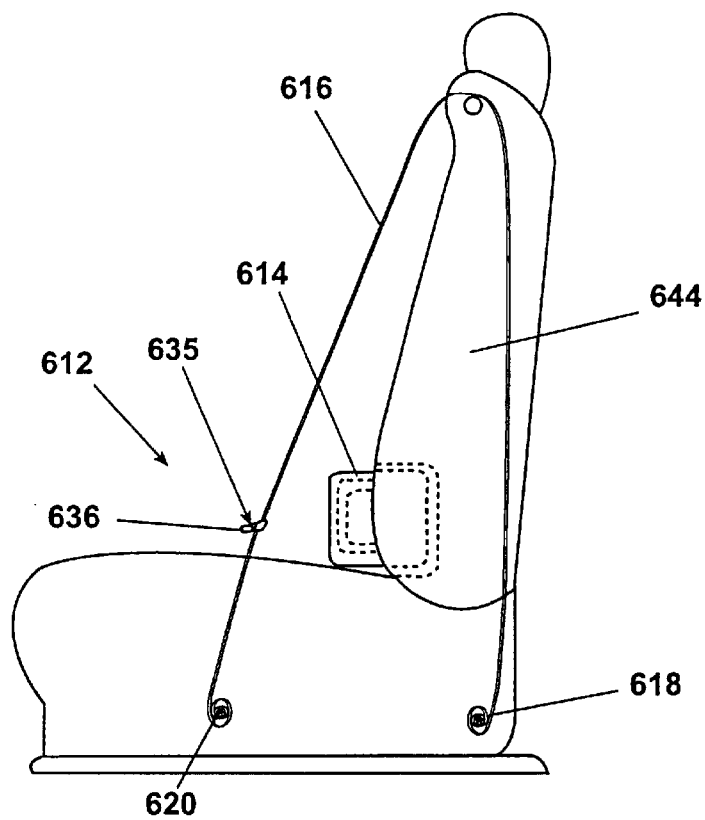
FIG. 22 is a side elevational view of the restraint presenter apparatus of FIG. 21 wherein the telescoping armrest is in a storage position.
Figure 23:
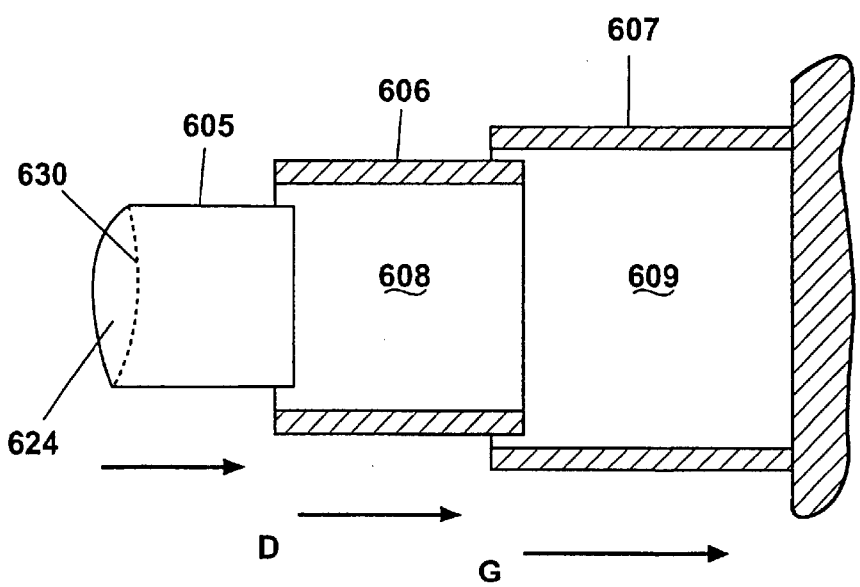
FIG. 23 is an enlarged cross-sectional view of the telescoping armrest in the presenting position.

In another embodiment, referring to FIGS. 21–23, a restraint presenting system 600 for a vehicle seat 612 may be provided with a telescoping armrest 614 that captures a contact portion 635 of a restraint belt 616. Telescoping armrest 614 is provided with a plurality of retractable elements, 605, 606 and 607 that move between a presenting position (shown in FIG. 21) and a storage position (shown in FIG. 22).

In a preferred embodiment, an intermediate retractable element 606 and a base retractable element 607 are provided with storage recesses 608 and 609, respectively as shown in FIG. 23. Storage recesses 608 and 609 each have a predetermined size such that an adjacent retractable element may be stored within the storage recesses when telescoping armrest 614 is moved into the storage position. For example, when telescoping armrest 614 is moved into the storage position, a presenting retractable element 605 moves laterally into storage recess 608 of intermediate retractable element 606, as indicated by directional arrows G in FIG. 23. Next, intermediate retractable element 606, with presenting retractable element 605 disposed therein, moves laterally into storage recess 609 of base retractable element 607, thereby placing telescoping armrest 614 into a storage position as seen in FIG. 22. Further, housing 644 may be provided with a storage recess (shown in phantom in FIG. 22) such that base retractable element 607, with both intermediate and presenting retractable elements 605 and 606 disposed therein, may be stored within housing 644 when not in use.

Preferably, telescoping armrest 614 is moved between the storage position and the presenting position by means of an electric gear motor connected to a rack-and-pinion or screw drive mechanism (not shown), although other suitable means may also be employed. The drive mechanism pushes retractable elements 605, 606 and 607 laterally relative to housing 644, whereby retractable elements 605, 606, and 607 are extended to position armrest 614 into a presenting position as shown in FIGS. 21 and 23. To return telescoping armrest 614 to the storage position, the electric gear motor actuates the screw drive mechanism in reverse to place retractable elements 605 and 606 within storage recesses 608 and 609, respectively. However, in the event of a power down situation, i.e., where the gear motor is inoperable, the retractable elements 605 and 606 may be manually pushed into storage recesses 608 and 609 to enable easy exit from the vehicle.

In accordance with the present invention, contact portion 635 of restraint belt 616 is co-linear with a distal end 624 of presenting retractable element 605 due to the cooperation of take-up reels 618 and 620. Preferably, distal end 624 is provided with a concave shaped portion 630, similar to concave shaped portion 30 of apparatus 10, that captures contact portion 635 of restraint belt 616 when armrest 614 is placed in presenting position. Thus, restraint belt 616 and buckle 636 are placed in operational position, as shown in FIG. 21, conveniently in clear view and within easy access of a vehicle occupant. When armrest 614 is returned to the storage position, as described above, and out of contact with restraint belt 616, take-up reels 618 and 620 automatically bias restraint belt 616 into a retracted position, as shown in FIG. 22.

Figure 24:
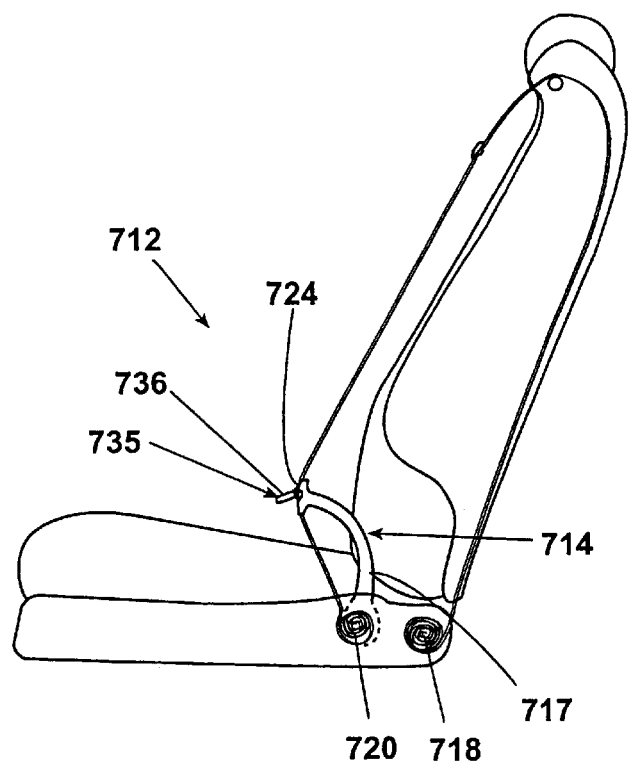
FIG. 24 is a side elevational view of an alternative embodiment of the restraint presenter system wherein an actuating arm is in the presenting position.
Figure 25:
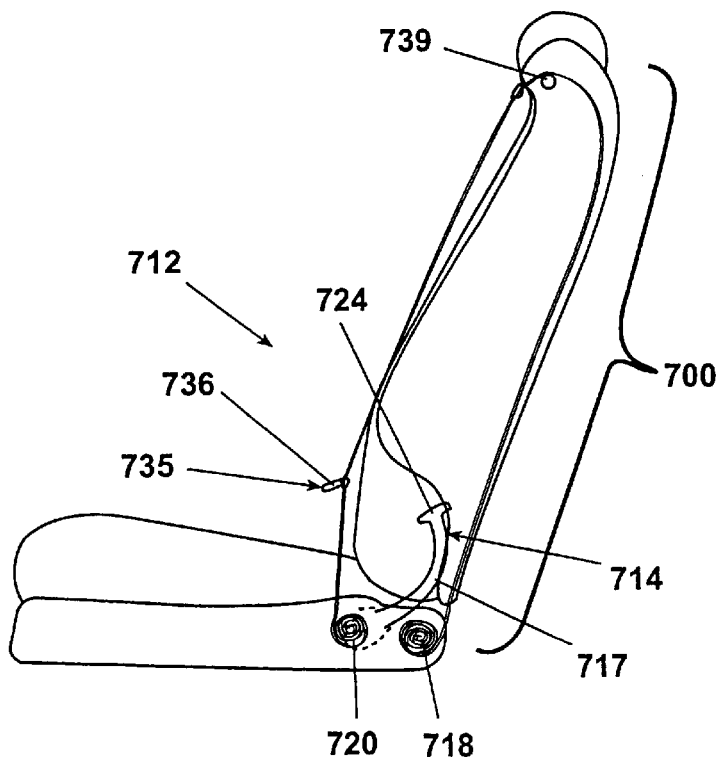
FIG. 25 is a side elevational view of the restraint presenter system of FIG. 24, wherein the actuating arm is in the storage position.

Referring to FIGS. 24–25, Where packaging restraints limit the practicality of incorporating an armrest with the vehicle seat 712, or an armrest is formed as part of a vehicle door, a vehicle restraint presenting system 700 may include a retractable actuating arm 714 for capturing a contact portion 735 of restraint belt 716 to move restraint belt 716 into an operational position. Actuating arm 714 includes a distal end 724 for capturing contact portion 735 of restraint belt 716 and a lever 717. Preferably distal end 724 has a concave shape, similar to concave shaped portion 30 of armrest 14 in system 10, such that restraint belt 716 is prevented from accidentally slipping off of actuating arm 714.

Lever 717 is shown as being pivotally connected to a base portion 737 of vehicle seat 712 at a pivot point 726 such that lever 717 pivots between a presenting position (shown in FIG. 3) and a storage position (shown in FIG. 24), similar to system 300. Alternatively, it is understood that actuating arm 714 may be pivotally mounted to base portion 737 in a manner similar to systems 10, 100, and 200. While lever 717 is shown as being curve shaped, it is understood that lever 717 may have any suitable shape. Further, instead of having lever 717, distal end 724 may alternatively be supported by scissor levers (not shown) similar to system 500 or by retractable members (not shown) similar to system 600.

In accordance with the invention, take-up reels 718 and 720 cooperate to position contact portion 735 of restraint belt 716 co-linear with actuating arm 714. Therefore, distal end 724 captures contact portion 735 when actuating arm is moved into the presenting position, properly positioning restraint belt 716 and buckle 736 in an operational position. Thus, buckle 736 is positioned within clear view and easy reach of a vehicle occupant.

In operation, actuating arm 715 is preferably moved out of a storage position, wherein actuating arm 715 is substantially parallel with a vehicle seat back 729, and into the presenting position automatically by a gear mounted drive mechanism (not shown) that pivots lever 717 toward restraint belt 716. Because contacting portion 735 of restraint belt 716 is co-linear with actuating arm 714, distal end 724 captures contacting portion 735 to move restraint belt 716 and buckle 736 from a retracted position to an operational position. Once restraint belt 716 and buckle 736 are placed in the operational position, the vehicle occupant grasps buckle 736 and secures buckle 736 to a latch mechanism (not shown) such that the vehicle occupant is secured to the vehicle seat 712 by restraint belt 716. In accordance with another aspect of the invention, once buckle 736 is removed from contact with distal end 724 of actuating arm 714, actuating arm 716 is automatically moved back into the storage position by the drive mechanism. When restraint belt 716 is released from the latching mechanism, restraint belt automatically returns to the retracted position, co-linear with actuating arm 714, due to the opposing biasing forces of take-up reels 718 and 720. In the event of a power down situation, i.e., where the gear mounted drive mechanism is inoperable, actuating arm 714 may be manually moved from the presenting position to the storage position.

Preferred embodiments of the present invention have been disclosed. A person of ordinary skill in the art would realize, however, that certain modifications would come within the teachings of this invention. Therefore, the following claims should be studied to determine the true scope and content of the invention.

What is claimed is:

1. A restraint presentation system for presenting a restraint belt to a vehicle occupant, comprising:

a vehicle seat;

a presenting member positioned adjacent said vehicle seat, said presenting member being movable between a presenting position and a storage position;

a track formed in a side surface of a seat back of said vehicle seat;

a shaft formed with said presenting member;

wherein said shaft is slidably received in said track and pivotally mounts said presenting member to said vehicle seat such that presenting member moves in a sweeping motion between the storage position and the presenting position; and a restraint belt connected to a tensioning mechanism, wherein said restraint belt has first and second end segments with a contact portion therebetween, said tensioning mechanism positioning at least said contact portion in a co-linear relationship with a distal end of presenting member such that said contact portion is captured by said distal end of said presenting member when said presenting member is in the presenting position, thereby positioning said restraint belt in an operational position so as to be readily accessible to the vehicle occupant.

2. The restrain presentation system of claim 1, wherein a portion of said vehicle seat has a contoured section that guides said distal end when said presenting member is moved in said sweeping motion between said storage and presenting positions.

3. The restraint presentation system of claim 1, further including a telescoping lever having a first end pivotally mounted to said presenting member and a second end pivotally mounted to said vehicle seat; said telescoping lever being a first predetermined length when said presenting member is in said storage position and a second predetermined length when in said presenting position.

4. A restraint presentation system for presenting a restraint belt to a vehicle occupant, comprising:

a vehicle seat;

a presenting member positioned adjacent said vehicle seat, said presenting member being movable between a presenting position and a storage position, wherein said presenting member is telescoping such that said presenting member collapses to said storage position, such that said presenting member has a predetermined length that is substantially smaller than the length of said presenting member when in said presenting position; and a restraint belt connected to a tensioning mechanism, wherein said restraint belt has first and second end segments with a contact portion therebetween, said tensioning mechanism positioning at least said contact portion in a co-linear relationship with a distal end of presenting member such that said contact portion is captured by said distal end of said presenting member when said presenting member moves into the presenting position, thereby positioning said restraint belt in an operational position so as to be readily accessible to the vehicle occupant.

5. A restraint presentation system for presenting a restraint belt to a vehicle occupant, comprising:

a vehicle seat;

a presenting member having a distal end associated with said vehicle seat, said presenting member being movable between a presenting position and a storage position, a pair of scissor levers connected together having two first ends slidably mounted to said presenting member; and two second ends slidably mounted to said vehicle seat;

wherein said first and second two ends are spaced apart a first predetermined distance when said presenting member is in said storage position and said first two ends and said second two ends slide towards one another a second predetermined distance to move said presenting member into said presenting position; and a restraint belt connected to a tensioning mechanism, wherein said restraint belt has first and second end segments with a contact portion therebetween said tensioning mechanism biasing said restraint belt into a retracted position when said presenting member is in said storage position such that at least said contact portion is in a co-linear relationship with a distal end of said presenting member such that said contact portion is captured by said distal end of said presenting member when said armrest is in the presenting position, thereby positioning said restraint belt presenting member in an operational position so as to be accessible to the vehicle occupant.

6. The restraint presentation system of claim 5, wherein said presenting member is formed from a portion of said vehicle seat.

* * * * *